United States Patent Office 3,734,999
Patented May 22, 1973

3,734,999
CONTROL OF CARBON BLACK QUALITY
Robert E. Dollinger, Toledo, Ohio, assignor to Phillips Petroleum Company, Bartlesville, Okla.
Continuation-in-part of abandoned application Ser. No. 838,265, July 1, 1969. This application Oct. 21, 1971, Ser. No. 191,504
Int. Cl. C09c 1/50
U.S. Cl. 423—450                7 Claims

ABSTRACT OF THE DISCLOSURE

Carbon black quality is controlled in a carbon black process wherein the smoke is prequenched to reduce the extent of the reaction prior to the final quench which terminates the reaction by measuring the concentration of methane and/or acetylene of the finally quenched smoke and adjusting the prequench according to said measurement to maintain the concentration of methane and/or acetylene in the finally-quenched smoke at a predetermined level.

---

This is a continuation-in-part of my application Ser. No. 838,265, filed July 1, 1969, now abandoned.

This invention relates to carbon black production.

In one of its more specific aspects, this invention relates to a method of controlling the quality of the carbon black produced from the furnace carbon black process.

Production of carbon black by means of the furnace process is well known. The process comprises decomposing a hydrocarbon in the presence of combustion gases to produce particulate black which is recovered from the reactor as a suspension in the off-gases from the process. While subsequent operations are directed to the recovery of the black, its properties are substantially determined within the furnace in which it is formed. Generally, the process is conducted in a series of reaction zones, the smoke being quenched in the first reaction zone to reduce the temperature of the smoke below the reaction temperature and terminate the reaction. The temperature at which the reaction is terminated is usually below about 1600° F.

There are many variables which have a principal effect on the properties of the carbon black produced. Some of these primary variables are the hydrocarbon feed rate, air to oil ratio, fuel to air ratio, and the like. In general, these primary variables are relatively easily controlled within acceptable limits. However, there are secondary variables which have a distinct effect upon the quality of the carbon black and these variables are less susceptible to control. Some of these include barometric pressure, humidity of the air, water content of the oil, the BMCI of the oil, and the like. Each of these is important because, while little control over them can be effected, each has an effect on the properties of the black, each exerts its effect without warning and, while the effect of each may be small, their cumulative effect is sometimes sufficient to result in the production of off-specification black.

There has now been developed a method of controlling the process which largely offsets the influence of such secondary variables and which requires the sensing of a single factor, or combination of like factors, which sensing can be made in a single determination. This invention provides such a method. This method is based on the discovery that once certain primary variables within the process are fixed within certain ranges, undesired changes in the less significant, or secondary, variables can be offset by a single adjustment to the process, this adjustment being made in a simple manner.

The method of this invention involves closely controlling the primary variables which are major factors in determining the quality of the black and collectively offsetting variations occurring in the less significant or secondary variables by determining the effect of their collective variations and adjusting, in compensation, that point at which the reaction is terminated, or at least partially terminated, to control the quality of the black to within specific property ranges.

Hence, the method of this invention involves controlling the properties of carbon black produced by the pyrolytic decomposition of the hydrocarbon in the presence of combustion gases which comprises sensing the composition of the gases comprising the smoke, adjusting the rate of quench introduced into the reactor responsive thereto to effect the extent to which the reaction is allowed to proceed, and thereby maintaining the quality of the carbon black substantially constant.

Hence, it is an object of this invention to provide a method for improving the uniformity of the quality of the carbon black produced.

It is another object of this invention to provide a method of minimizing the effect of noncontrollable variables on carbon black quality.

As mentioned, carbon black reactors are comprised of a series of contiguous reaction zones. Quench is introduced into one of the zones to terminate the reaction. Prequench can be introduced into the reaction at a plurality of points prior to the final quench. The present invention introduces prequench, generally water, into at least one of these points to the extent of reducing the extent of the reaction which occurs subsequent to the point of that prequench introduction. The prequench is introduced to lower the temperature at which the reaction proceeds thereafter, prior to being terminated by the introducion of the final quench.

It is commercial practice to produce carbon black having a photometer greater than about 85 to 90. However, such control is not sufficiently sensitive to other aspects of carbon black quality to provide control of the extent to which the reaction is allowed to proceed. Accordingly, the present invention is advantageously practiced when the photometer of the carbon black is maintained at about a value of 90 or above and the prequench is introduced after the carbon black has attained this photometer value.

That component within the smoke whose concentration is sensed is preferably methane. However, any component or combination of components can be used as a basis of control. In practicing the method of this invention, those principal variables which are controllable with relative ease are maintained as constant as possible, the quality of the carbon black as reflected by its surface area is related to the concentration of some component in the smoke, the concentration of this component being subject to variation with the surface area of the black, and the amount of prequench introduced into the reactor is adjusted to maintain the concentration of that component in the smoke at a constant value.

This invention will be explained in terms of adjustment of the prequench rate in response to the methane content of the smoke although the invention is not limited thereto.

In a series of runs, the principal variables were maintained constant at the particular charge oil rate employed, and the effect of prequench rate on surface area and the corresponding methane content of the smoke was determined. Results were as follows when producing a black having a photelometer value greater than 90:

| Charge oil rate, g.p.h. | Prequench rate, g.p.m. | Methane in smoke, vol. percent | Carbon black surface area, $N_2SA$, m.$^2$/100 g. |
|---|---|---|---|
| 250 | 3 | 0.28 | 160 |
| 250 | 5 | 0.35 | 134 |
| 250 | 7 | 0.38 | 121 |
| 250 | 9 | 0.41 | 108 |
| 260 | 2 | 0.31 | 147 |
| 260 | 4 | 0.39 | 129 |
| 260 | 6 | 0.43 | 116 |
| 300 | 1 | 0.46 | 110 |
| 300 | 3 | 0.56 | 100 |

Based on these and related determinations, that family of curves in the attached figures was constructed.

Figure 2:
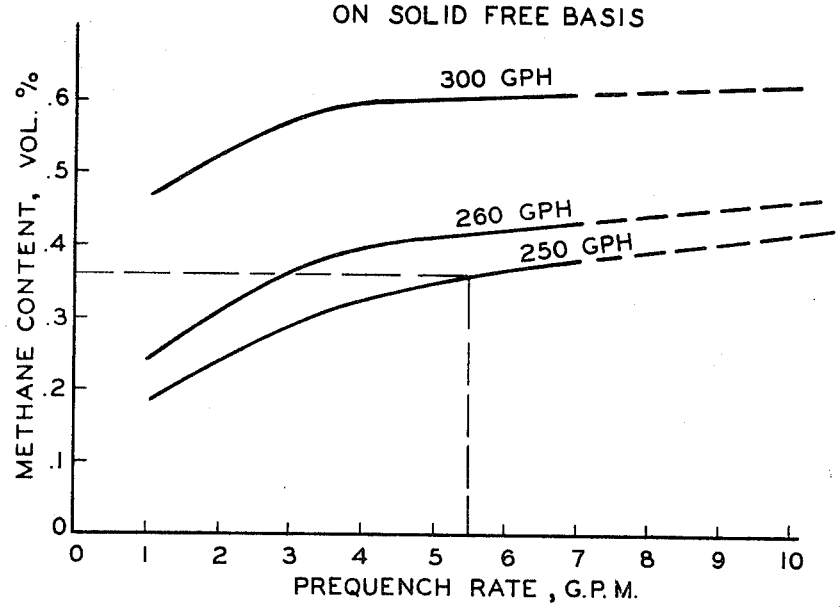
FIG. 2 is a correlation of the prequench rate and the methane content of the smoke at constant values of hydrocarbon feed rates.
Figure 1:
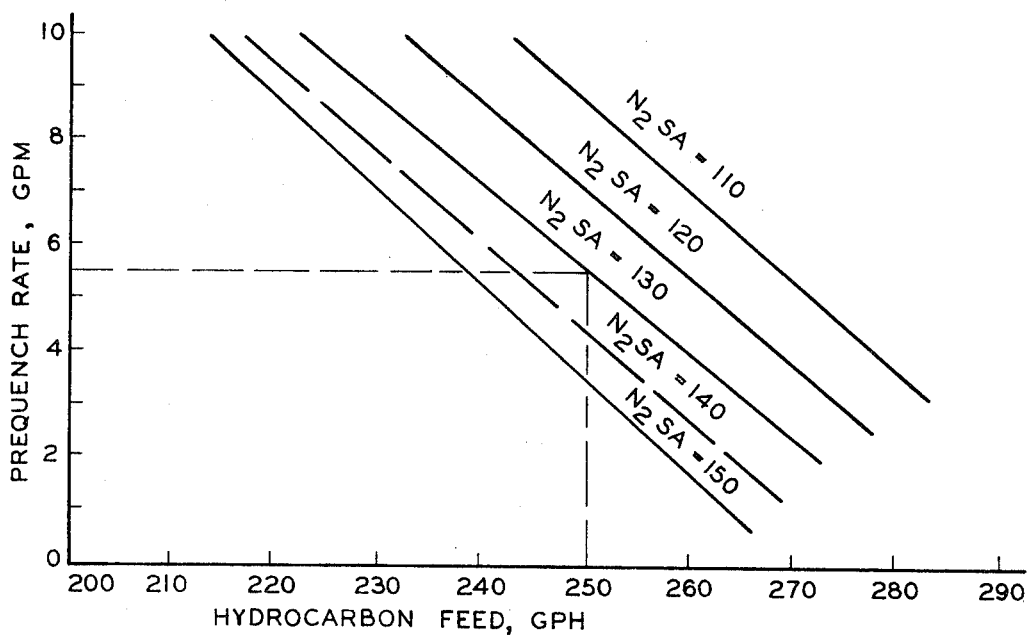
FIG. 1 is a correlation of the prequench rate and the hydrocarbon feed rate at constant values of surface areas.

Applying these data and curves in the practice of this invention, if it is assumed that the hydrocarbon feed rate is 250 g.p.m., with the primary variables maintained constant, from FIG. 1 it will be seen that a prequench rate of 5.5 g.p.m. will produce a carbon black having a surface area of about 130. Relatedly, from FIG. 2, the control will be based upon a prequench rate which regulates the methane content within the smoke to about 0.36 volume percent.

It will be appreciated that the pratice of the method of this invention can be based upon determining the concentration of any component within the smoke to control any of the properties of the black. Inasmuch as the smoke contains its various components in widely varying percentages, control of the system is preferably based upon that component whose percentage in the smoke is varying percentage-wise, at that point within the reaction to the greatest degree. For example, variations in the percentages of nitrogen, hydrogen, carbon monoxide, and carbon dioxide within the prequench zone, while being of measurable magnitude, will be small in relation to the relatively large quantities of these components within the smoke. On the other hand, variations in the percentages of methane and acetylene will be small in magnitude, but large in relation to the relatively small quantities of these components within the smoke. Accordingly, control is preferably based upon the methane or acetylene concentration within the smoke, or upon the combined concentration of these two components therein.

The method of this invention is easily applied. Preferably, analysis of the smoke is made for that component, or those components, concerned downstream of the final quench point where the reaction has been terminated. Depending upon the concentration of the control component so determined, the quantity of prequench introduced into the reactor upstream of the final quench point is adjusted, preferably automatically, to produce the desired concentration of the control component in the smoke after the final quench. The particular property of carbon black is thereby controlled relatively constant, the primary variables being held substantially constant, regardless of the variation of the comparatively uncontrollable secondary variables. It is also possible to make such prequench introduction at a plurality of points and to alter the quantity introduced at each particular introduction dependent upon the extent of the deviation of the control component from its desired value.

As mentioned, the process concerned in the present invention is that in which a hydrocarbon feed, having for example a BMCI above about 100, is introduced into a carbon black furnace and brought to a decomposition temperature within the range of from about 1800° F. to above 3000° F. by being contacted with hot combustion gases produced by the oxidation of a fuel, such as natural gas, with a free oxygen-containing oxidant, preferably a gaseous oxidant such as air, various known air-to-oil ratios being employed. The combined reactant mass is conducted through the reaction zone under conditions to form carbon black. Thereafter, the reactant mass is quenched, usually in a downstream portion of the reactor and usually with water to cool the reactant mass below the decomposition temperature of the hydrocarbon feed, that is, to a temperature of from about 1200° F. to about 1600° F. This quenching is performed at a point within the reactor at which substantially all of the hydrocarbon feed has been decomposed to carbon black and to other components comprising the gases in which the carbon black is contained, these comprising methane, carbon monoxide, acetylene and the like. The method of this invention measures the concentration of any of those components in the reactant mass after a first quenching of the reactant mass directed to bringing the concentration of the measured component in the reactant mass to a desired value.

That series of runs presented see column 3, lines 8–23 was carried out in the above manner, under substantially identical conditions within the aforementioned ranges, with the exception of the hydrocarbon feed rate (charge oil rate) and the prequench rate which were varied as indicated.

In all of these runs, the points at which the prequench and the final quench were introduced were maintained constant. Only the prequench rate was varied in response to the methane content of the smoke measured after the final quench to alter the surface area of the black or, as could be done in the alternate, to maintain it at a desired value.

The resulting correlations shown in the attached figures are specific to the particular feedstock employed in that series of runs and to the conditions under which the carbon black was produced. However, they indicate that for any feedstock and for any set of operating conditions employed with that feedstock, related curve can be established which enable the production of a carbon black having a desired nitrogen surface area when employing the analysis of the smoke as a control.

Specific application of the invention to a process is given in the following embodiment which illustrates the best mode for carrying out the invention.

A conventional carbon black reactor is adapted with a conduit for the introduction of water prequench upstream of the final water quench. The distance need be only nominal depending upon the amount of turbulence established between the two point, and while it can be as little as two feet, it can easily be determined. Preferably, the reactor is adapted with a series of prequench points at spaced intervals along the reactor so that a choice as to the location of the prequench introduced can be made.

Downstream of the final water quench there is positioned a methane analyzer tap which withdraws a sample of smoke from the reactor, filters it and analyzes it for methane. This methane analyzer has a preselected set point for the value of methane desired in the quenched gases and transmits a signal to a controller which regulates the positioning of a control valve positioned in the water prequench to maintain the methane content constant. All such apparatus is old in the art and needs no further clarification.

Employing this system, operations were conducted as followed:

| Operation | I | II | III |
|---|---|---|---|
| Oil rate, g.p.h. | 240 | 255 | 255 |
| Total air, m.s.c.f.h. | 210 | 210 | 210 |
| Fuel gas, m.s.c.f.h. | 11.7 | 11.7 | 11.7 |
| Reactor length, in.: | | | |
| To prequench | 36 | 36 | 36 |
| To final quench | 90 | 90 | 90 |
| Temperature prior to prequench, °F | 2,450 | 2,440 | 2,440 |
| Temperature after prequench, °F | 1,800 | 1,790 | 1,850 |
| Prequench rate, g.p.m. | 5.5 | 5.5 | 4.8 |
| Methane content in quenched smoke, (solids and $H_2O$-free basis) vol. percent | 0.36 | 0.40 | 0.36 |
| $N_2SA$, m.²/gm. | 130 | 125 | 130 |
| Structure, DBP, cc./100 gm | 138 | 137 | 137 |
| Photelometer | 90 | 85 | 87 |

Under Operation I, carbon black having a surface area of 130 was produced. For some unexplainable reason, the oil rate increased to 255 g.p.h.

In the absence of the practice of this invention, those conditions represented by Operation II would have resulted. Specifically, the methane content in the quenched smoke (on an $H_2O$-free basis) would have risen to 0.40 vol. percent and the surface area of carbon black would have fallen to 125. Because the amount of oxygen introduced into the reactor remained the same, the temperature after the prequench would have fallen to about 1790° F.

However, the above-described control system responded to adjust the conditions to those represented by Operation III such that a carbon black comparable to that produced under Operation I resulted.

The analyzer sensed the increased methane content of the smoke. It transmitted a signal to the controller which adjusted the position of the control valve in the prequench conduit to decrease the prequench rate to 4.8 g.p.m., which maintained the methane content at 0.36 and the surface area at 130. As a result, the temperature after the prequench point was increased to about 1850° F. As a result, the temperature at this locus at which the feed was decomposed was increased to compensate for the larger quantity of feed. By so doing, a carbon black of substantially the same surface area as that produced under the original operating conditions was recovered from the process.

It will be appreciated that from the above discussion that certain modifications to this invention can be made. These are considered as being within the scope of the invention.

What is claimed is:

1. In a method for the production of carbon black by the pyrolytic decomposition of a hydrocarbon with hot combustion gases produced by the oxidation of a fuel with a free oxygen-containing gas wherein the smoke is prequenched to reduce the extent of the reaction prior to the final quench which terminates the reaction, the improvement which comprises controlling the quality of the carbon black product by measuring the concentration of methane and/or acetylene in the finally-quenched smoke and adjusting the prequench according to said measurement to maintain the concentration of methane and/or acetylene in the finally-quenched smoke at a predetermined substantially constant value.

2. The method of claim 1 in which the concentration of methane is measured.

3. The method of claim 1 in which the concentration of acetylene is measured.

4. The method of claim 2 in which the quench is water.

5. The method of claim 4 in which the smoke is prequenched at a plurality of points.

6. The method of claim 2 in which the smoke is prequenched to a temperature of about 1800° F.

7. The method of claim 2 in which the smoke is finally quenched to a temperature between about 1200° F. and about 1600° F.

References Cited
UNITED STATES PATENTS

| | | | |
|---|---|---|---|
| 2,953,436 | 9/1960 | Kron | 423—456 |
| 3,390,960 | 7/1968 | Forseth | 423—456 |
| 3,401,020 | 9/1968 | Kester et al. | 423—450 |

EDWARD J. MEROS, Primary Examiner

U.S. Cl. X.R.

23—232